United States Patent [19]

Arakawa

[11] Patent Number: 5,596,202
[45] Date of Patent: Jan. 21, 1997

[54] RADIATION IMAGE STORAGE PANEL AND METHOD FOR USING THE SAME

[75] Inventor: Satoshi Arakawa, Kanagawa-ken, Japan

[73] Assignee: Fuji Photo Film Co., Ltd., Kanagawa, Japan

[21] Appl. No.: 504,260

[22] Filed: Jul. 19, 1995

[30] Foreign Application Priority Data

Sep. 20, 1994 [JP] Japan .................................. 6-225067

[51] Int. Cl.⁶ .......................... G03B 42/02; G01N 23/04
[52] U.S. Cl. ............................. 250/484.4; 250/584
[58] Field of Search ...................... 378/165, 166; 250/484.4, 581, 584

[56] References Cited

U.S. PATENT DOCUMENTS

| | | | |
|---|---|---|---|
| 3,631,243 | 12/1971 | Byler et al. | 378/166 |
| 4,320,296 | 3/1982 | Ishida et al. | 250/584 |

FOREIGN PATENT DOCUMENTS

| | | | |
|---|---|---|---|
| 14436 | 8/1980 | European Pat. Off. | 378/166 |
| 61-72089 | 4/1986 | Japan . | |
| 62-209187 | 9/1987 | Japan . | |
| 254942 | 10/1989 | Japan . | 378/166 |

*Primary Examiner*—Carolyn E. Fields
*Attorney, Agent, or Firm*—Sughrue, Mion, Zinn, Macpeak & Seas

[57] ABSTRACT

In a radiation image read-out method, a radiation image storage panel, on which a radiation image has been stored, is exposed to stimulating rays, which cause the panel to emit light in proportion to the amount of energy stored thereon during its exposure to radiation. The emitted light is photoelectrically detected with a photoelectric read-out device, which has detection characteristics such that it may detect light having wavelengths within a wavelength distribution range different from the wavelength distribution range of the stimulating rays and may not detect light having wavelengths within the wavelength distribution range of the stimulating rays. An image signal representing the radiation image is thereby obtained. An identification code is formed on a portion of the radiation image storage panel by using a fluorescent substance. When the fluorescent substance is exposed to the stimulating rays, it produces the fluorescence having wavelengths capable of being detected by the photoelectric read-out device. The identification code is used such that it may be clear which identification code corresponds to which information providing specific information about a radiation image.

9 Claims, 7 Drawing Sheets

RADIATION IMAGE STORAGE PANEL AND METHOD FOR USING THE SAME

BACKGROUND OF THE INVENTION

1. Field of the Invention

This invention relates to a radiation image storage panel for use in a radiation image read-out method. This invention particularly relates to a radiation image storage panel, which is provided with an identification code for a radiation image, and a method for using the radiation image storage panel.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet or a radiation image storage panel). The radiation image storage panel, on which the radiation image has been stored, is then scanned with stimulating rays, such as a laser beam, which cause the panel to emit light in proportion to the amount of energy stored thereon during its exposure to the radiation. The light emitted by the radiation image storage panel, upon stimulation thereof, is photoelectrically detected and converted into an electric image signal. The image signal is then processed and used for the reproduction of the radiation image of the object as a visible image on a recording material.

In hospitals, or the like, it is necessary for a large number of radiation images to be processed quickly. In order to satisfy the requirement, it is important how each radiation image stored on a radiation image storage panel is identified. Therefore, a method has heretofore been proposed, wherein a radiation image storage panel is provided with an identification code, such as a bar code, corresponding to identification information providing specific details about the radiation image. The identification information includes, for example, patient information, such as the name of the patient recorded and the date of birth of the patient, and the image characteristics information, such as the date on which the radiation image was recorded, the radiation dose used, and the part of the patient recorded. The identification code is then read out from the radiation image storage panel. The identification information giving specifics about the radiation image stored on the radiation image storage panel, which information corresponds to the read out identification, is used together with an image signal, which has been detected from the corresponding radiation image storage panel, for image processing, or the like. Also, an apparatus for recording such an identification code on a radiation image storage panel has been proposed in, for example, U.S. Pat. No. 4,320,296. With the proposed apparatus, an identification code, which corresponds to identification information giving specifics about a radiation image and which may be in the form of a bar code, character information, or the like, is recorded on part of the radiation image storage panel, on which the radiation image has been store. The identification code is recorded with an information input device utilizing ultraviolet rays, or the like, each time a radiation image has been recorded on a radiation image storage panel. The identification code is then read out together with an image signal by being scanned with stimulating rays. Thereafter, the identification information corresponding to the identification code having thus been read out is read from a storage means and used in image processing, or the like, together with the corresponding image signal.

A radiation image read-out apparatus, which is provided with a means for reading out an identification code corresponding to identification information from a radiation image storage panel, has been proposed by the present invention in U.S. Pat. No. 4,889,233. The radiation image read-out apparatus comprises (a) a cassette holding section for holding a cassette, (b) a read-out section for reading out a radiation image from a radiation image storage panel, on which the radiation image has been stored, and (c) a panel conveyance means for receiving the radiation image storage panel from the cassette held in the cassette holding section, conveying the radiation image storage panel into the read-out section, and thereafter conveying the radiation image storage panel into the cassette. When the radiation image storage panel is taken out of the cassette, which houses the radiation image storage panel therein, a cover member of the cassette is opened. A reading means, such as a bar code reader, for reading out the identification code is then moved through the opening, which has been opened by the cover member, to a portion of the radiation image storage panel, on which the identification code has been put. The reading means reads out the identification code from the radiation image storage panel and is then retracted from the portion of the radiation image storage panel, on which the identification code has been put. Thereafter, the identification information, which corresponds to the identification code having thus been read out, and the image signal, which has been detected from the corresponding radiation image storage panel are utilized in image processing, or the like.

However, with the apparatus for recording an identification code on a radiation image storage panel, which has been proposed in U.S. Pat. No. 4,320,296, a special device for irradiating ultraviolet rays, or the like, to the radiation image storage panel must be used in order to record the identification code on the radiation image storage panel. Also, with the radiation image read-out apparatus proposed in U.S. Pat. No. 4,889,233, the reading means, such as a bar code reader, must be used in order to read out the identification code from the radiation image storage panel. Therefore, the structure of the apparatus cannot be kept simple, and the cost of the apparatus cannot be kept low.

SUMMARY OF THE INVENTION

The primary object of the present invention is to provide a radiation image storage panel for use in a radiation image read-out method, wherein an identification code is capable of being put on the radiation image storage panel without the need for a complicated apparatus, and the identification code is capable of being read out from the radiation image storage panel without the need for complicated apparatus.

Another object of the present invention is to provide a method for using the radiation image storage panel.

The present invention provides a radiation image storage panel for use in a radiation image read-out method for exposing a radiation image storage panel, on which a radiation image has been stored, to stimulating rays, which cause the radiation image storage panel to emit light in proportion to the amount of energy stored thereon during its exposure to radiation, and photoelectrically detecting the emitted light with a photoelectric read-out means, which has detection characteristics such that it may detect light having wavelengths falling within a wavelength distribution range different from the wavelength distribution range of the stimulating rays and may not detect light having wavelengths falling within the wavelength distribution range of the stimulating rays, an image signal representing the radiation image being thereby obtained, wherein the provision of an identification code on a portion of the radiation image storage panel by using a fluorescent substance, the substance producing fluorescence, which has wavelengths falling within the wavelength distribution range capable of being detected by the photoelectric read-out means, when the fluorescent substance is exposed to the stimulating rays, the identification code being used such that it may be clear which identification code corresponds to which information providing specific details about a radiation image.

In the radiation image storage panel in accordance with the present invention, the identification code is put on a portion of the radiation image storage panel by using the fluorescent substance for producing the fluorescence, which has wavelengths falling within the wavelength distribution range capable of being detected by the photoelectric read-out means. Specifically, the portion of the radiation image storage panel on which the identification code is put may be a portion of the front surface or the back surface of the radiation image storage panel.

The identification code may be one of various kinds of codes, which can be put on the radiation image storage panel. For example, the identification code may be a bar code, a coded number, character information, or the like.

The identification code may be located on a portion other than the image recording area of the radiation image storage panel.

Also, the fluorescent substance may comprise of a fluorescent substance, which produces fluorescence having wavelengths shorter than the wavelengths of the stimulating rays when it is exposed to the stimulating rays, and the photoelectric read-out means has the detection characteristics such that it may detect light having the wavelengths shorter than the wavelengths of the stimulating rays.

Alternatively, the fluorescent substance may constituted of a fluorescent substance, which produces the fluorescence having wavelengths longer than the wavelengths of the stimulating rays when it is exposed to the stimulating rays, and the photoelectric read-out means has the detection characteristics such that it may detect light having the wavelengths longer than the wavelengths of the stimulating rays.

The present invention also provides a method for using a radiation image storage panel, comprising the steps of:

i) exposing a radiation image storage panel in accordance with the present invention to radiation, which carries image information of an object, a radiation image of the object being thereby stored on the radiation image storage panel, ii) exposing the radiation image storage panel, on which the radiation image has been stored, to stimulating rays, which cause the radiation image storage panel to emit light in proportion to the amount of energy stored thereon during its exposure to radiation, and iii) photoelectrically detecting the emitted light and the fluorescence, which is produced by the fluorescent substance located on the portion of the radiation image storage panel when the radiation image storage panel is exposed to the stimulating rays, with a photoelectric read-out means, which has detection characteristics such that it may detect light having wavelengths falling within a wavelength distribution range different from the wavelength distribution range of the stimulating rays and may not detect light having wavelengths falling within the wavelength distribution range of the stimulating rays, whereby an image signal representing the radiation image and a code signal representing the identification code are obtained, the code signal being used such that it may be clear which code signal corresponds to which information providing specific details about a radiation image.

With the radiation image storage panel in accordance with the present invention, the identification code is put on a portion of the radiation image storage panel by using the fluorescent substance for producing the fluorescence, which has wavelengths falling within the wavelength distribution range capable of being detected by the photoelectric read-out means, when the fluorescent substance is exposed to the stimulating rays. The identification code may be put on a portion of the radiation image storage panel before a radiation image is stored on the radiation image storage panel. Thereafter, the radiation image storage panel, on which the identification code has been put, may be subjected to an operation for recording a radiation image. In order for an image signal representing the radiation image to be obtained, the radiation image storage panel, on which the radiation image has been stored, is then exposed to the stimulating rays. When the radiation image storage panel is thus exposed to the stimulating rays, the portion of the radiation image storage panel, on which portion the identification code has been put, is also exposed to the stimulating rays. Therefore, the light carrying the radiation image information is emitted by the radiation image storage panel, and the fluorescence carrying the information representing the identification code is produced by the fluorescent substance located on the portion of the radiation image storage panel. The fluorescence has the wavelengths capable of being detected by the photoelectric read-out means and is detected by the photoelectric read-out means of a radiation image read-out apparatus together with the light emitted by the radiation image storage panel. In this manner, an image signal representing the radiation image and a code signal representing the identification code are obtained. The code signal representing the identification code is fed into an image processing unit for carrying image processing on the image signal and is utilized for the image processing. Alternatively, the code signal is fed into an image reproducing apparatus and utilized for the reproduction of a visible image from the image signal. In this manner, the identification code may be merely put on the radiation image storage panel and can be read out from the radiation image storage panel by using the same apparatus as the radiation image read-out apparatus. Therefore, in cases where the identification code is put on the radiation image storage panel by utilizing a sealing tape, or the like, a particular apparatus need not be used in order to record the identification code on the radiation image storage panel. Also, a reading means, such as a bar code reader, need not be used in order to read out the identification code from the radiation image storage panel. Accordingly, with an apparatus which has a simple structure and is cheap, it is possible to obtain the code signal to be used such that it may be clear which code signal corresponds to which information providing specific details about a radiation image.

The fluorescent substance for forming the identification code may be located on a portion other than the radiation image recording area of the radiation image storage panel. In such cases, the image signal detected from the radiation image storage panel is not adversely affected by the identification code.

DESCRIPTION OF THE PREFERRED EMBODIMENTS

The present invention will hereinbelow be described in further detail with reference to the accompanying drawings.

Figure 1:
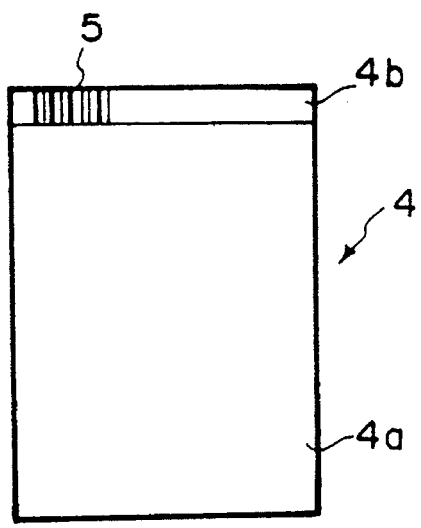
FIG. 1 is a schematic view showing an embodiment of the radiation image storage panel in accordance with the present invention.

FIG. 1 is a schematic view showing an embodiment of the radiation image storage panel in accordance with the present invention. As illustrated in FIG. 1, a radiation image storage panel 4 in accordance with the present invention comprises a stimulable phosphor layer 4a and a portion 4b, on which a transparent sealing tape having a bar code 5 formed thereon is provided. When the stimulable phosphor layer 4a is exposed to radiation carrying image information of an object, a radiation image of the object is stored on the stimulable phosphor layer 4a. When the stimulable phosphor layer 4a, on which the radiation image has been stored, is then exposed to stimulating rays, the stimulable phosphor layer 4a emits light in proportion to the amount of energy stored thereon during its exposure to the radiation. The bar code 5 is formed on the transparent sealing tape by forming the bars, which have predetermined thicknesses and are located at predetermined intervals, by an infrared emitting fluorescent substance. When the infrared emitting fluorescent substance is exposed to the stimulating rays, it produces the fluorescence having wavelengths longer than the wavelengths of the stimulating rays.

As the stimulable phosphor, it is possible to employ, for example, a $BaFBr:Eu^{2+}$ phosphor, which emits light having a peak wavelength of 390 nm when it is exposed to a laser beam having been produced by a He-Ne laser, which has a wavelength of 632.8 nm and serves as the stimulating rays. As the infrared emitting fluorescent substance, it is possible to employ, for example, a $\gamma\text{-}AlF_3:Fe^+$ fluorescent substance, which produces the fluorescence having a peak wavelength in the vicinity of 750 nm when it is exposed to the stimulating rays having a wavelength of 632.8 nm.

On the portion 4b, the bar code 5 is formed from the infrared emitting fluorescent substance. The bar code 5 represents an identification code to be used such that it may be clear which identification code corresponds to which identification information giving specifics about a radiation image. The identification information about a radiation image includes, for example, patient information such as the name of the patient recorded (or the code patient information representing the name of the patient recorded), the date of birth of the patient, the gender of the patient, and the clinical chart number. The identification information giving specifics about a radiation image also includes the image characteristics information. The image characteristics information includes, for example, management information, such as the date (and time) on which the radiation image was recorded, the place (the image recording room or the image recording apparatus) at which the radiation image was recorded, and the name of the image recording engineer. The image characteristics information also includes the image recording conditions, such as the X-ray tube voltage and current, the X-ray exposure time, and the X-ray tube-to-film distance (FFD). The image characteristics information further includes the conditions under which the image processing (such as frequency processing or gradation processing) is to be carried out. The image characteristics information may further include the information necessary for the image processing step, such as the portion of the patient of which was recorded (e.g., the chest or the abdomen in cases where the object is a human body), and the mode which was used when the image was recorded (e.g., a simple image recording mode or a contrasted image recording mode). All of the identified information need not necessarily be recorded, and only those pieces of information which are necessary for the management of the radiation image storage panel and for the image processing, may be specified.

In a radiation image recording apparatus (not shown), a radiation image of an object is stored on the radiation image storage panel 4, which is provided with the identification code.

In this embodiment, the identification code is formed as the bar code 5. However, no limitation is imposed on the kind of the identification code. For example, the identification code may be formed as a coded number or character information.

Figure 2:
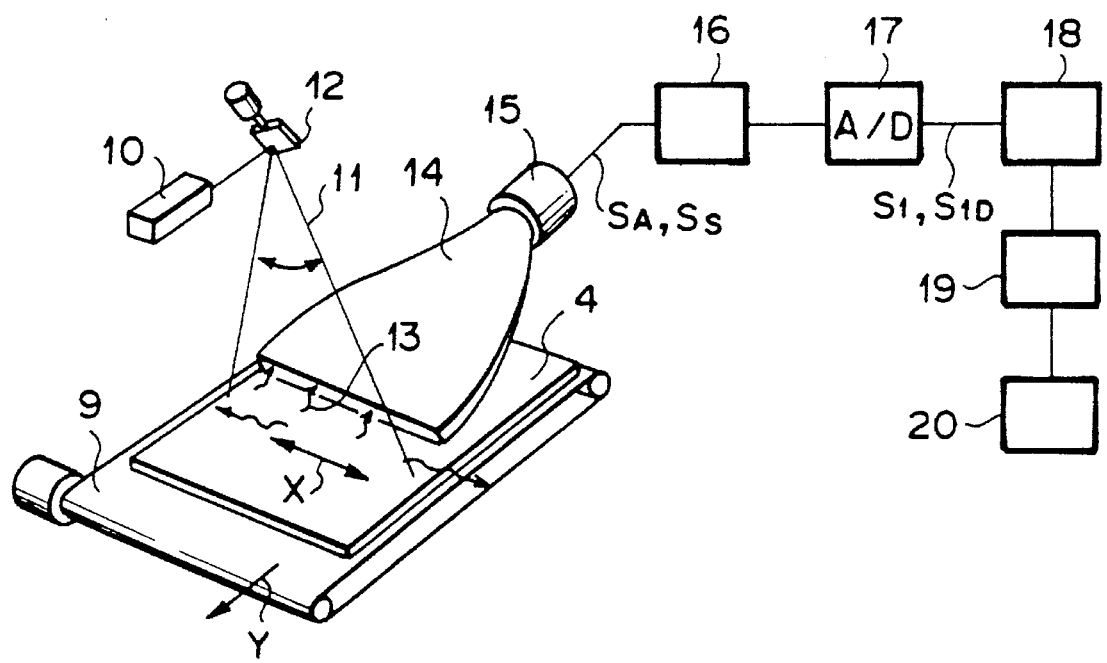
FIG. 2 is a perspective view showing an example of a radiation image read-out apparatus.
Figure 3:
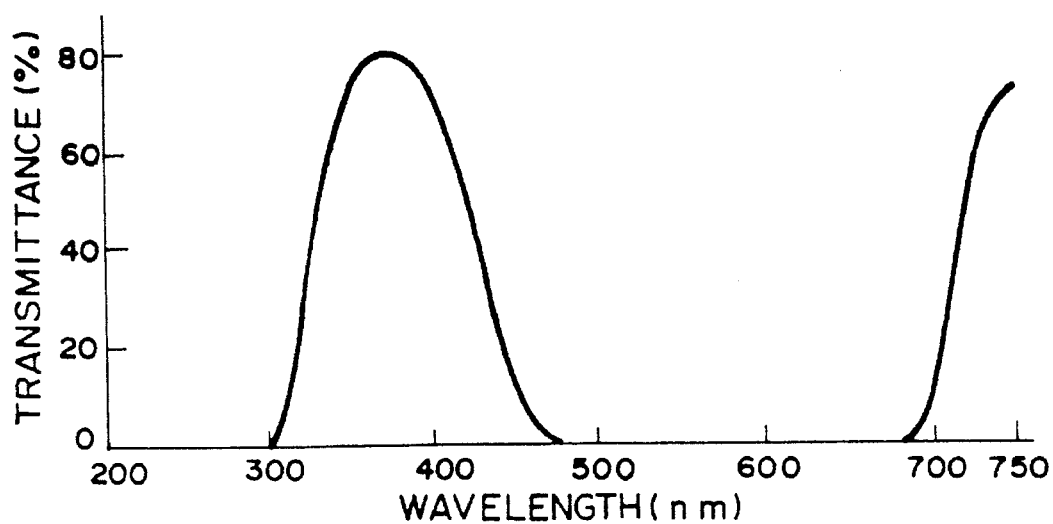
FIG. 3 is a graph showing spectral transmittance characteristics of an example of a filter, which is located such that it may be in close contact with a photoelectric read-out means.

Thereafter, the radiation image is read out from the radiation image storage panel 4, on which the radiation image has been stored, by using an image read-out means shown in FIG. 2, and an image signal representing the radiation image is thereby obtained. Specifically, the radiation image storage panel 4 is moved by a sub-scanning means 9 in the sub-scanning direction indicated by the arrow Y. The sub-scanning means 9 may comprise a continuous belt, or the like. At the same time, a laser beam 11, which serves as stimulating rays, is produced by a laser beam source 10. The laser beam 11 is deflected by a scanning mirror 12 and is caused to scan the radiation image storage panel 4 in the main scanning directions indicated by the double-headed arrow X. When the radiation image storage panel 4 is exposed to the laser beam 11, it emits light 13 in proportion to the amount of energy stored thereon during its exposure to the radiation. The emitted light 13 enters a light guide member 14, which is made from a transparent acrylic plate, from its one edge face. The emitted light 13 is guided through repeated total reflections inside of the light guide member 14 and detected by a photomultiplier 15. A filter is located such that it may be in close proximity the light receiving face of the photomultiplier 15. The filter filters out light having wavelengths falling within the wavelength distribution range of the stimulating rays and transmits only light having wavelengths falling within the wavelength distribution range of the light emitted by the radiation image storage panel 4. The stimulating rays, which have been reflected by the radiation image storage panel 4, are filtered out by the filter and are thus prevented from entering into the photomultiplier 15. By way of example, a filter B-370 supplied by Hoya Corp. may be employed. FIG. 3 shows spectral transmittance characteristics of the filter B-370.

The emitted light 13, which has passed through the filter, is photoelectrically detected by the photomultiplier 15. The photomultiplier 15 generates an output signal $S_A$ corresponding to the amount of the emitted light 13, i.e. representing the radiation image stored on the radiation image storage panel 4.

Figure 4:
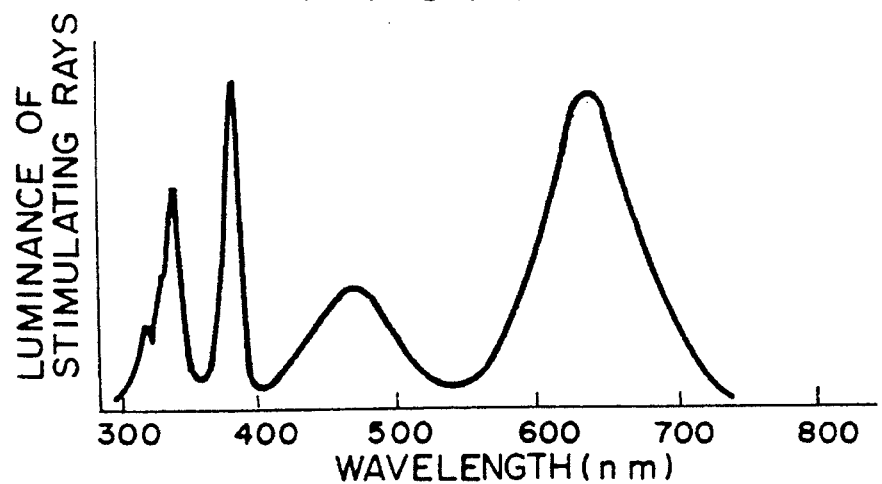
FIG. 4 is a graph showing a stimulation spectrum for a fluorescent substance, which produces the fluorescence capable of being detected by a photoelectric read-out means.
Figure 5:
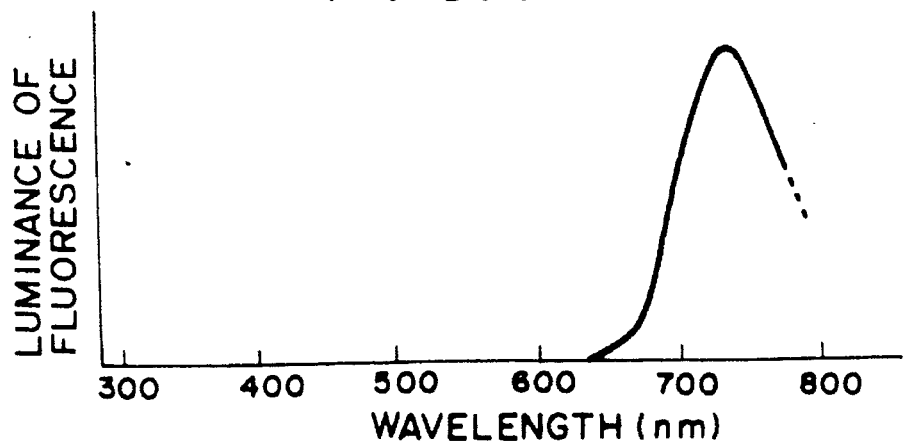
FIG. 5 is a graph showing a light emission spectrum of a fluorescent substance, which produces the fluorescence capable of being detected by a photoelectric read-out means.

When the radiation image storage panel 4 is exposed to the laser beam 11, the infrared emitting fluorescent substance located on the radiation image storage panel 4 produces the fluorescence, which carries the information representing the bar code 5. FIG. 4 is a graph showing the stimulation spectrum for the infrared emitting fluorescent substance. FIG. 5 is a graph showing the light emission spectrum of the infrared emitting fluorescent substance. As illustrated in FIGS. 4 and 5, the infrared emitting fluorescent substance produces the fluorescence having a peak wavelength of 750 nm when it is exposed to the stimulating rays having wavelengths in the vicinity of 630 nm. Therefore, the fluorescence passes through the filter, which has the spectral transmittance characteristics shown in FIG. 3 and is located such that it may be in close contact with the light receiving face of the photomultiplier 15. The fluorescence, which has passed through the filter, enters into the photomultiplier 15. The photomultiplier 15 generates an analog signal $S_S$, which represents the bar code information proportional to the amount of the fluorescence produced by the infrared emitting fluorescent substance, i.e. the identification code corresponding to the identification information giving specifics about the radiation image.

The analog signal $S_S$ and the output signal $S_A$ are logarithmically amplified by a logarithmic amplifier 16 and are then converted respectively by an analog-to-digital converter 17 into a digital image signal $S_1$ and an identification information signal $S_{ID}$. The digital image signal $S_1$ and the identification information signal $S_{ID}$ are stored on a storage medium 18, such as a magnetic disk.

The digital image signal $S_1$ and the identification information signal $S_{ID}$ are then read from the storage medium 18 and fed into an image processing means 19. In the image processing means 19, it is made clear which information represented by the identification information signal $S_{ID}$ corresponds to which identification information stored in the image processing means 19. Also, in the image processing means 19, predetermined image processing is carried out on the digital image signal $S_1$ in accordance with the information which may be stored among the identification information. The image signal $S_1$, which has been obtained from the image processing, is fed-into an image reproducing means 20, which may be constituted of a laser printer, a cathode ray tube display device (CRT), or the like. In the image reproducing means 20, the image signal $S_1$ is used for the reproduction of a visible image.

As the fluorescent substance, which is used to form the identification code and produces the fluorescence having wavelengths different from the wavelengths of the stimulating rays, it is possible to employ any of number of fluorescent substances, which produce the fluorescence having wavelengths such that it can pass through the filter located close to the light receiving face of the photomultiplier 15 when they are exposed to the stimulating rays. In lieu of the aforesaid fluorescent substance producing the fluorescence having wavelengths longer than the wavelengths of the emitted light 13, a fluorescent substance producing the fluorescence having wavelengths comparatively close to the wavelengths of the emitted light 13 may be employed.

For example, in cases where a GaAs semiconductor laser, which produces a laser beam having a wavelength of 850 nm, is employed as the stimulating ray source in lieu of the He-Ne laser described above, a stimulable phosphor capable of being stimulated by the stimulating rays having a wavelength of 850 nm is employed. Such a stimulable phosphor includes, for example, a phosphor, which is disclosed in Japanese Unexamined Patent Publication No. 61(1986)-72089 and is represented by the general formula $M^I X \cdot aM^{II} X_2' \cdot bM^{III} X_3'' : cA$, wherein $M^I$ is at least one alkali metal selected from the group consisting of Li, Na, K, Rb, and Cs and contains at least either one of Rb and Cs; $M^{II}$ is at least one bivalent metal selected from the group consisting of Be, Mg, Ca, Sr, Ba, Zn, Cd, Cu, and Ni; $M^{III}$ is at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In; each of X', X", and X''' is at least one halogen selected from the group consisting of F, Cl, Br, and I; A is at least one metal selected from the group consisting of Tl, Na, Ag, and Cu; a is a number satisfying $0 \leq a \leq 1$; b is a number satisfying $0 \leq b \leq 0.5$; and c is a number satisfying $0 < c \leq 0.2$. The aforesaid stimulable phosphor also includes, for example, a phosphor, which is disclosed in Japanese Unexamined Patent Publication No. 62(1987)-209187 and is represented by the general formula $M^I X \cdot aM^{II} X_2'' \cdot bTl$, wherein $M^I$ is at least one alkali metal selected from the group consisting of Na, K, Rb, and Cs; $M^{II}$ is at least one bivalent metal selected from the group consisting of Mg, Ca, Sr, Ba, Zn, Cd, Cu, and Ni; each of X' and X" is at least one halogen selected from the group consisting of F, Cl, Br, and I; a is a number satisfying $0 \leq a \leq 4.0$; and b is a number satisfying $0 < b \leq 0.2$.

Figure 6:
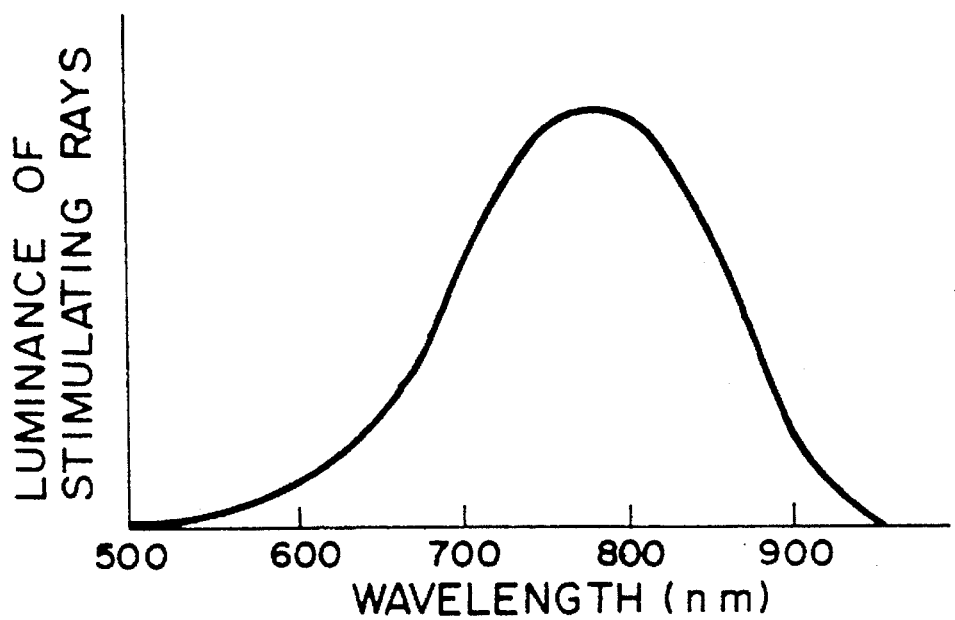
FIG. 6 is a graph showing a stimulation spectrum for a radiation image storage panel.
Figure 7:
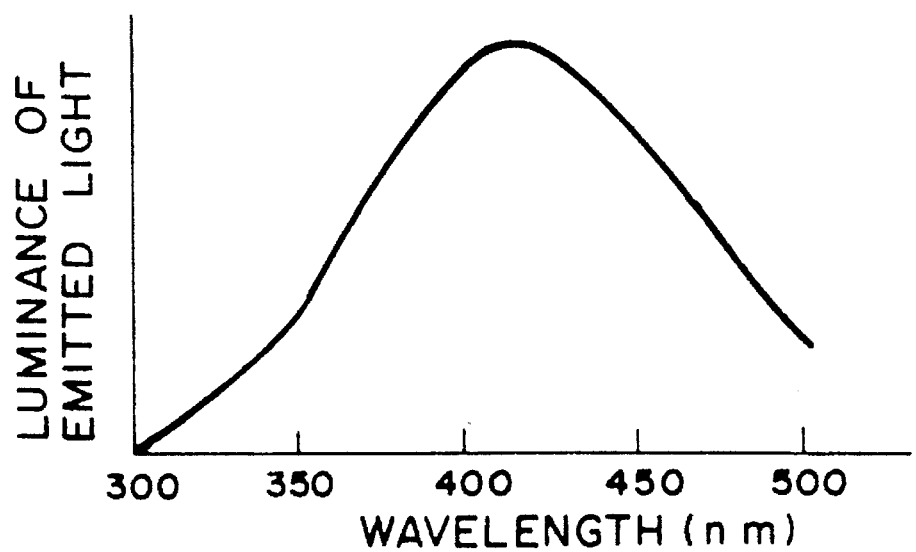
FIG. 7 is a graph showing a light emission spectrum of a radiation image storage panel.
Figure 8:
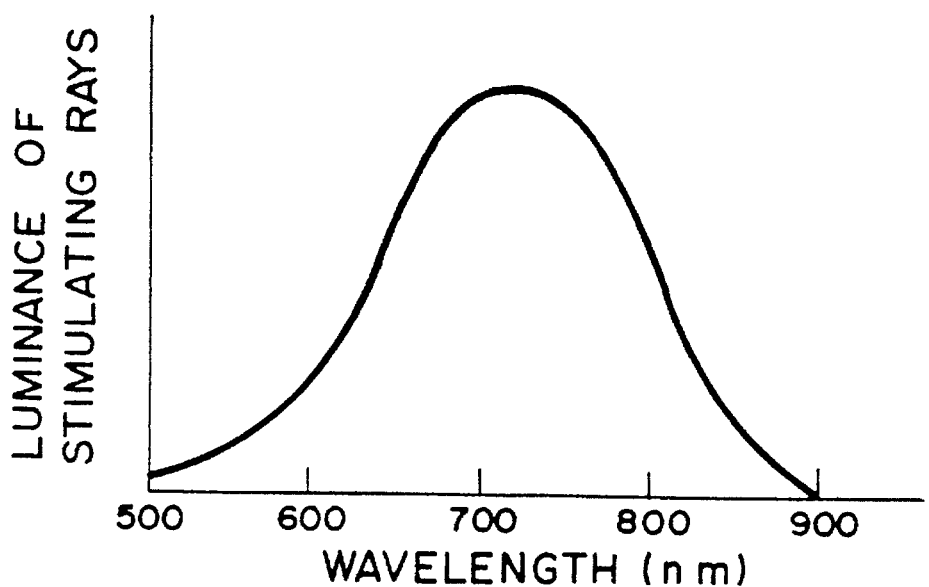
FIG. 8 is a graph showing a stimulation spectrum for a different radiation image storage panel.
Figure 9:
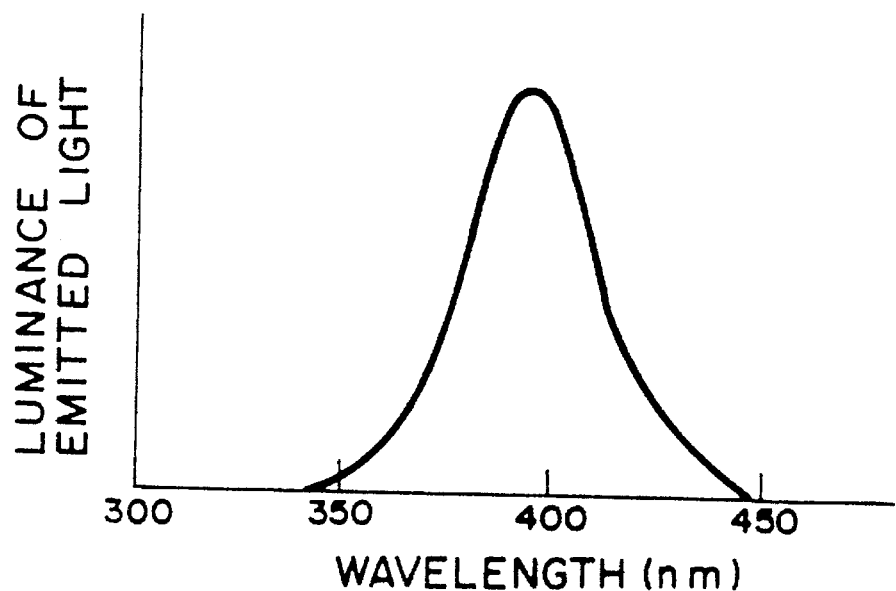
FIG. 9 is a graph showing a light emission spectrum of a different radiation image storage panel.

FIG. 6 is a graph showing a stimulation spectrum for a radiation image storage panel, in which the stimulable phosphor layer comprises of a phosphor represented by the formula $CsI \cdot 0.05\ BaF_2 \cdot 0.01 AlF_3 : 0.002Na$. FIG. 7 is a graph showing a light emission spectrum of the radiation image storage panel, in which the stimulable phosphor layer comprises a phosphor represented by the formula $CsI \cdot 0.05 BaF_2 \cdot 0.01 AlF_3 : 0.002Na$. FIG. 8 is a graph showing a stimulation spectrum for a radiation image storage panel, in which the stimulable phosphor layer comprises of a phosphor represented by the formula RbBr·0.5BaFBr·0.001Tl. FIG. 9 is a graph showing a light emission spectrum of the radiation image storage panel, in which the stimulable phosphor layer comprises a phosphor represented by the formula RbBr·0.5BaFBr·0.001Tl. As indicated from FIGS. 6, 7, 8, and 9, the two types of the radiation image storage panels described above are stimulated by the stimulating rays having a wavelength of 850 nm and emit light having wavelengths in the vicinity of 400 nm.

Figure 10:
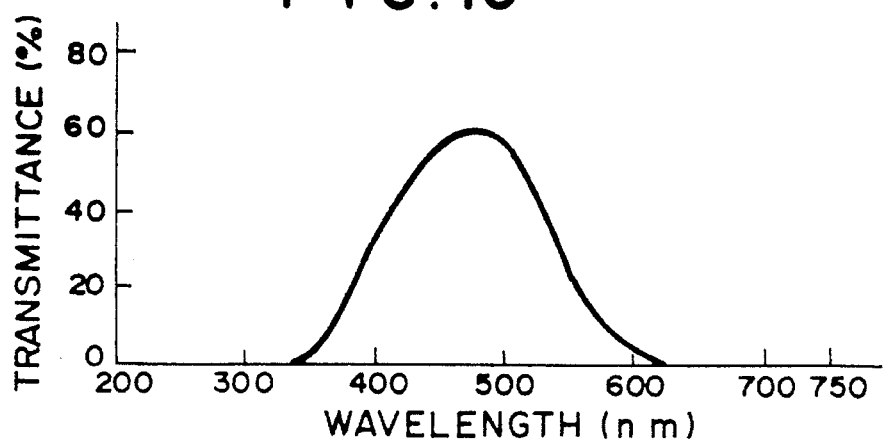
FIG. 10 is a graph showing spectral transmittance characteristics of a different example of a filter, which is located such that it may be in close contact with a photoelectric read-out means.
Figure 11:
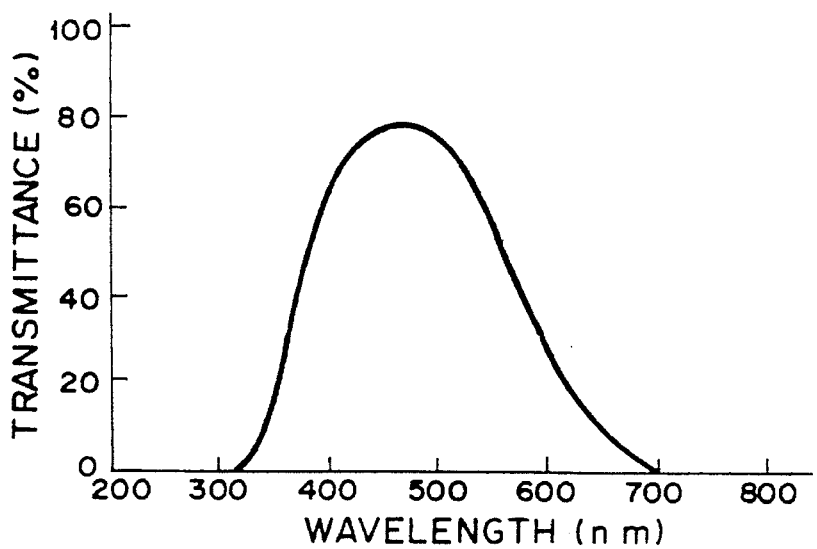
FIG. 11 is a graph showing spectral transmittance characteristics of a further different example of a filter, which is located such that it may be in close contact with a photoelectric read-out means.

Also, in cases where the stimulating rays and the radiation image storage panels described above are employed, the filter located such that it may be in close contact with the light receiving face of the photomultiplier 15 may be the B-480 filter supplied by Hoya Corp. or the B-48 filter supplied by Toshiba Glass Co., Ltd. The B-480 filter has the spectral transmittance characteristics shown in FIG. 10. The B-48 filter has the spectral transmittance characteristics shown in FIG. 11. In FIG. 10, the spectral transmittance characteristics are shown with respect to the wavelength range not longer than 750 nm. However, the transmittance of the B-480 filter supplied by Hoya Corp. for light falling within the infrared range is as low as $9 \times 10^{-3}\%$ filter light having a wavelength of 850 nm, is as low as 0.01% filter light having a wavelength of 900 nm, and is as low as 0.08% filter light having a wavelength of 1,000 nm. In cases where such a filter is located such that it may be in close contact with the light receiving face of the photomultiplier 15, the photomultiplier 15 can detect the emitted light 13 having a wavelength in the vicinity of 400 nm, and the stimulating rays, which have a wavelength of 850 nm and have been reflected by the radiation image storage panel filtered out.

Figure 12:
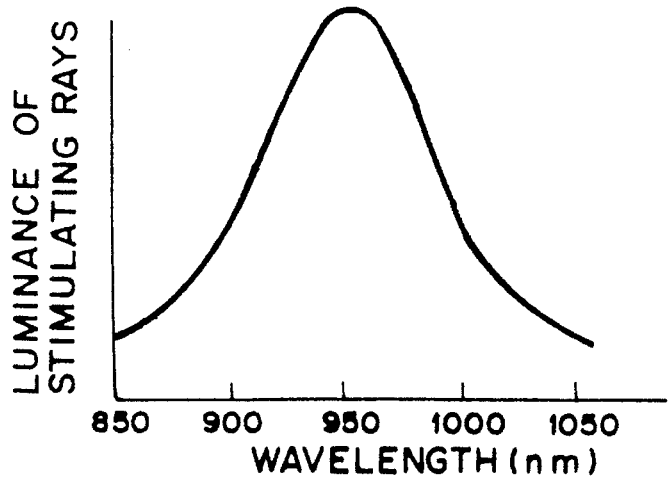
FIG. 12 is a graph showing a stimulation spectrum for a different fluorescent substance, which produces the fluorescence capable of being detected by a photoelectric read-out means.

In this embodiment, as the fluorescent substance for forming the identification code, a fluorescent substance represented by the formula $NaYb(WO_4)_2:Er$ is employed. The fluorescent substance is dispersed in a binder and used in order to form the identification code. FIG. 12 is a graph showing a stimulation spectrum for the fluorescent substance employed in this embodiment. As illustrated in FIG. 12, the fluorescent substance can produce the fluorescence when it is exposed to the stimulating rays having a wavelength of 850 nm. The fluorescence produced by the fluorescent substance has a peak wavelength of 525 nm and can substantially pass through each of the aforesaid two types of the filters, which have the spectral transmittance characteristics shown in FIGS. 10 and 11.

Besides the two types of the fluorescent substances described above, infrared-to-visible converting fluorescent substances, such as certain kinds of rare earth element fluorescent substances, are known. The infrared-to-visible converting fluorescent substances absorb light having long wavelengths and produce the fluorescence having short wavelengths by the quantum count effects or the multi-stage energy transfer effects. As the fluorescent substance for forming the identification code, a fluorescent substance may be selected appropriately from various kinds of fluorescent substances, including the infrared-to-visible converting fluorescent substances, in accordance with the wavelengths of the stimulating rays and the characteristics of the filter.

Also, in the embodiment described above, the identification code is formed from the fluorescent substance for producing fluorescence capable of being detected by the photoelectric read-out means and is located at the portion 4b of the radiation image storage panel 4. Alternatively, a layer of the fluorescent substance may be overlaid upon the portion 4b of the radiation image storage panel 4, and a transparent sealing tape, on which a bar code has been formed with black bars having predetermined thicknesses and being located at predetermined intervals, may be put on the fluorescent substance layer. In such cases, when the radiation image storage panel 4 is exposed to the stimulating rays, the fluorescence is produced by approximately the entire area of the portion 4b of the radiation image storage panel 4, but is not radiated from the portions corresponding to the bars of the bar code. Therefore, the fluorescence having a brightness-darkness pattern reverse to the brightness-darkness pattern obtained in the aforesaid embodiment is obtained.

Figure 13:
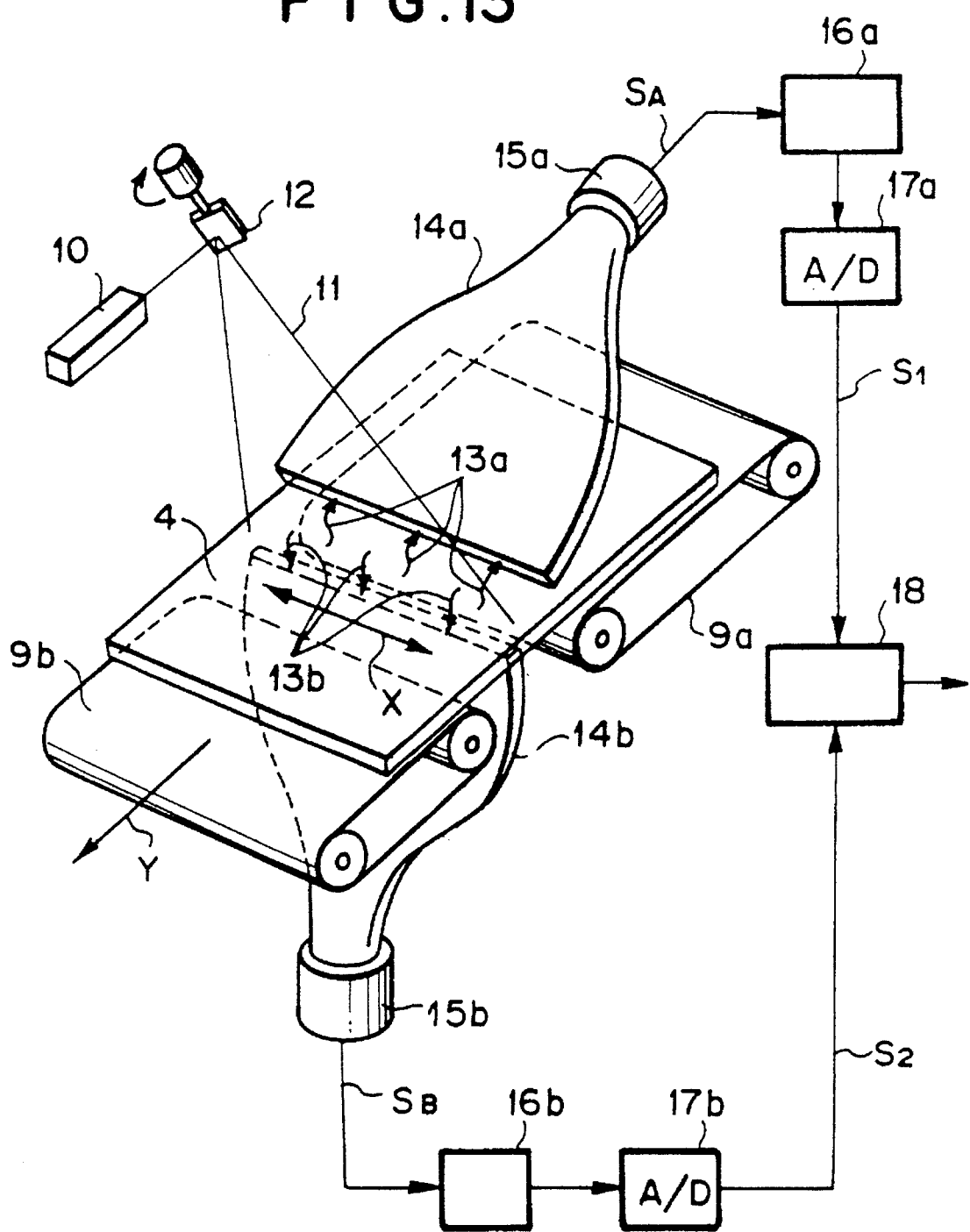
FIG. 13 is a perspective view showing an example of an apparatus for detecting light emitted by two surfaces of a radiation image storage panel.

Further, in the embodiment described above, as illustrated in FIG. 2, the radiation image is stored on the radiation image storage panel 4, and one surface of the radiation image storage panel 4 is exposed to the stimulating rays such that the image signal may be detected. Alternatively, as illustrated in FIG. 13, two image signals may be obtained by detecting light emitted by the two surfaces of the radiation image storage panel 4 and may then be added to each other. How the operation for detecting the light emitted by the two surfaces of the radiation image storage panel 4 is carried out will be described hereinbelow.

With reference to FIG. 13, the radiation image storage panel 4 is placed on endless belts 9a and 9b. The endless belts 9a and 9b are rotated by motors (not shown). A laser beam source 10 and a scanning mirror 12 are located above the radiation image storage panel 4. The laser beam source 10 produces a laser beam 11 serving as stimulating rays, which cause the radiation image storage panel 4 to emit light in proportion to the amount of energy stored thereon during its exposure to the radiation. The scanning mirror 12 reflects and deflects the laser beam 11, which has been produced by the laser beam source 10, such that the laser beam 11 may scan the radiation image storage panel 4 in main scanning directions. A light guide member 14a is located above and close to the position on the radiation image storage panel 4, Which is being scanned with the laser beam 11. The light guide member 14a collects light, which is emitted by the radiation image storage panel 4 when it is scanned with the laser beam 11, from above the radiation image storage panel 4. Also, a light guide member 14b is located below the position on the radiation image storage panel 4, which is being scanned with the laser beam 11. The light guide member 14b is located perpendicularly to the radiation image storage panel 4 and collects the light, which is emitted by the radiation image storage panel 4 when it is scanned with the laser beam 11, from below the radiation image storage panel 4. The light guide members 14a and 14b are located such that they may respectively be in close contact with photomultipliers 15a and 15b, which photoelectrically detects the light emitted by the radiation image storage panel 4. The photomultipliers 15a and 15b are respectively connected to logarithmic amplifiers 16a and 16b. The logarithmic amplifiers 16a and 16b are respectively connected to analog-to-digital converters 17a and 17b. The analog-to-digital converters 17a and 17b are connected to a storage medium 18.

The radiation image storage panel 4, on which the radiation image has been stored, is set at a predetermined position on the endless belts 9a and 9b. The radiation image storage panel 4, which has been set at the predetermined position, is conveyed by the endless belts 9a and 9b in a sub-scanning direction indicated by the arrow Y. Also, the laser beam 11 is produced by the laser beam source 10. The laser beam 11, which has been produced by the laser beam source 10, is reflected and deflected by the scanning mirror 12. The laser beam 11, which has thus been reflected and deflected by the scanning mirror 12, impinges upon the radiation image storage panel 4 and scans it in the main scanning directions indicated by the double headed arrow X. The main scanning directions are approximately normal to the sub-scanning direction indicated by the arrow Y. When the radiation image storage panel 4 is exposed to the laser beam 11, the exposed portion of the radiation image storage panel 4 emits light in proportion to the amount of energy stored thereon during its exposure to the radiation. The light, which is emitted upwardly by the radiation image storage panel 4, is represented by reference numeral 13a. The light, which is emitted downwardly by the radiation image storage panel 4, is represented by reference numeral 13b. The emitted light 13a is guided by the light guide member 14a and photoelectrically detected by the photomultiplier 15a. The emitted light 13a, which has entered from the input end face of the light guide member 14a into the light guide member 14a, is guided through repeated total reflections inside of the light guide member 14a, emanates from the output end face of the light guide member 14a, and is received by the photomultiplier 15a. The amount of the emitted light 13a representing the radiation image is converted by the photomultiplier 15a into an electric signal. In the same manner as that described above, the emitted light 13b is guided by the light guide member 14b and is photoelectrically detected by the photomultiplier 15b.

As illustrated in FIG. 1, the radiation image storage panel 4 is provided with the bar code 5, which represents the identification code and is formed with the fluorescent substance. The analog signal $S_s$, which represents the bar code information, i.e. the identification code corresponding to the identification information giving specifics about the radiation image, is generated.

The identification code formed with the fluorescent substance may be read out from the two surfaces of the radiation image storage panel 4. Alternatively, the signal representing the identification code may be detected from only either one of the front and back surfaces of the radiation image storage panel 4.

The photomultiplier 15a generates an analog output signal $S_A$ and the analog output signal $S_s$. The analog output signals $S_A$ and $S_S$ are logarithmically amplified by the logarithmic amplifier 16a and converted into a digital image signal $S_1$ and an identification information signal $S_{ID}$ by the analog-to-digital converter 17a. The digital image signal $S_1$ and the identification information signal $S_{ID}$ are then fed into the storage medium 18. Also, the photomultiplier 15b generates an analog output signal $S_B$. The analog output signal $S_B$ is logarithmically amplified by the logarithmic amplifier 16b and converted into a digital image signal $S_2$ by the analog-to-digital converter 17b. The digital image signal $S_2$ is then fed into the storage medium 18. The image signal components of the two image signals $S_1$ and $S_2$ are added to each other, which image signal components represent corresponding picture elements on the front and back surfaces of the radiation image storage panel 4. An addition signal, which has thus been obtained from the addition process, and the identification information signal $S_{ID}$ are then fed into an image processing means (not shown). In the image processing means, it is made clear which information represented by the identification information signal $S_{ID}$ corresponds to which identification information stored in the image processing means. Also, in the image processing means, predetermined image processing is carried out on the addition signal in accordance with the information, which may be stored among the identification information. The addition signal, which has been obtained from the image processing, is fed into an image reproducing means (not shown), which may comprises a laser printer, a cathode ray tube display device (CRT), or the like. In the image reproducing means, the addition signal is used for the reproduction of a visible image.

Figure 14:
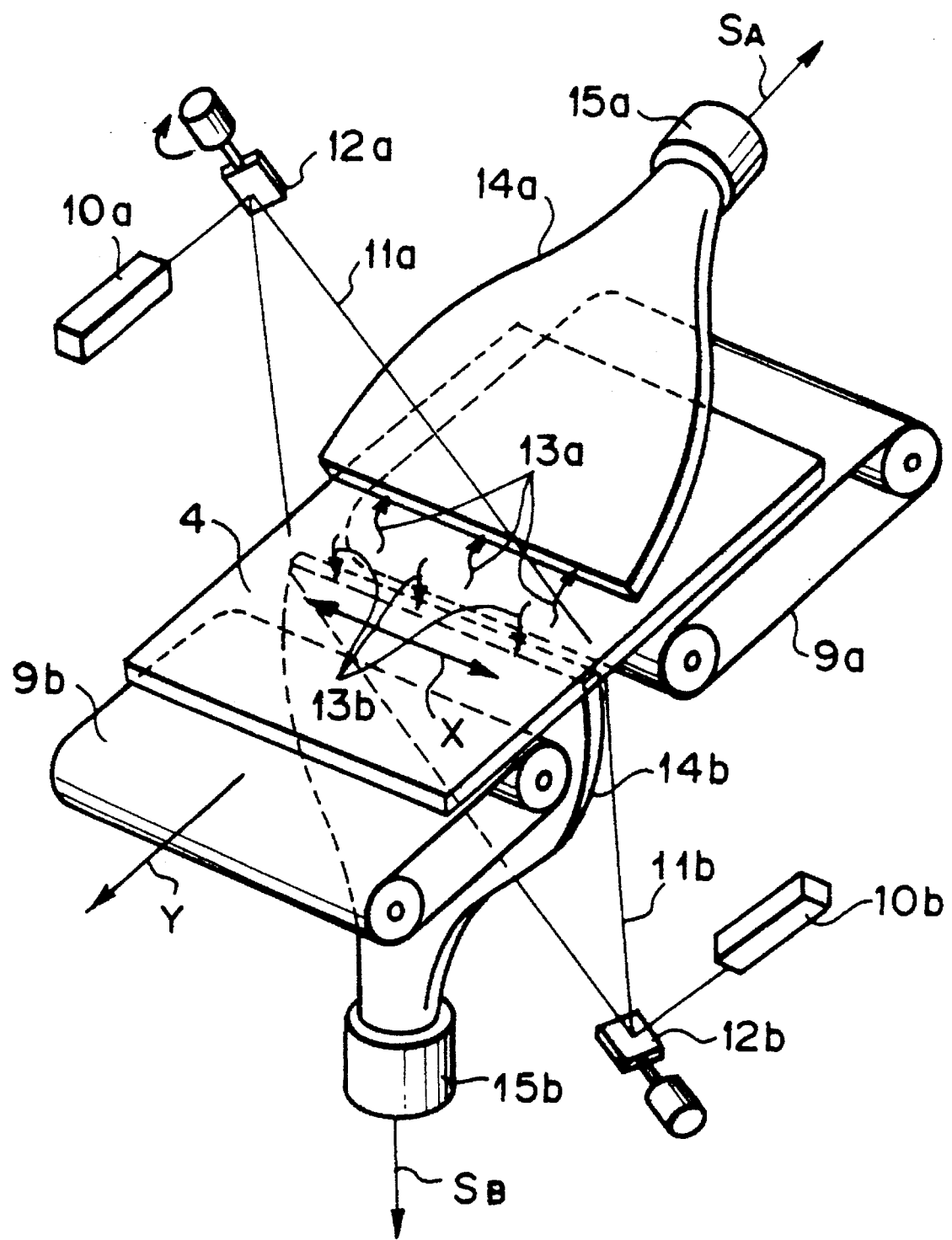
FIG. 14 is a perspective view showing a different example of an apparatus for detecting light emitted by two surfaces of a radiation image storage panel.

In the operation for detecting the light emitted by the two surfaces of the radiation image storage panel, the radiation image storage panel 4 is scanned with the laser beam 11, which has been produced by the single laser beam source 10. Alternatively, as illustrated in FIG. 14, a laser beam source 10a and a scanning mirror 12a may be located on the front surface side of the radiation image storage panel 4. Also, a laser beam source 10b and a scanning mirror 12b may be located on the back surface side of the radiation image storage panel 4. The two surfaces of the radiation image storage panel 4 may be scanned respectively with laser beams 11a and 11b, which have been produced by the laser beam sources 10a and 10b. The light emitted by the two surfaces of the radiation image storage panel 4 may thus be detected, and two image signals may thereby be obtained.

What is claimed is:

1. A radiation image storage panel for use in a radiation image read-out method using a stimulable sheet, wherein a radiation image stored on said stimulable sheet is subjected to stimulating rays, and the radiation image is detected by a photoelectric read-out means, said storage panel comprising:

an identification code portion recorded using a fluorescent substance, said fluorescent substance producing fluorescence which has wavelengths falling within the wavelength distribution range capable of being detected by the photoelectric read-out means when said fluorescent substance is exposed to the stimulating rays, said identification code portion being used to associate descriptive information with the radiation image.

2. A radiation image storage panel as defined in claim 1 wherein said identification code portion is located on a portion other than an image recording area of the radiation image storage panel.

3. A radiation image storage panel as defined in claim 1 wherein said fluorescent substance produces fluorescence having wavelengths shorter than the wavelengths of the stimulating rays when it is exposed to the stimulating rays.

4. A radiation image storage panel as defined in claim 2 wherein said fluorescent substance produces fluorescence having wavelengths shorter than the wavelengths of the stimulating rays when it is exposed to the stimulating rays.

5. A radiation image storage panel as defined in claim 1 wherein said fluorescent substance produces fluorescence having wavelengths longer than the wavelengths of the stimulating rays when it is exposed to the stimulating rays.

6. A radiation image storage panel as defined in claim 2 wherein said fluorescent substance produces fluorescence having wavelengths longer than the wavelengths of the stimulating rays when it is exposed to the stimulating rays.

7. A method for using the radiation image storage panel of claim 1, 2, 3, 4, 5, or 6, comprising the steps of:

i) exposing the radiation image storage panel to radiation carrying image information of an object to store a radiation image on the storage panel, ii) exposing the radiation image storage panel to stimulating rays, which cause the radiation image storage panel to emit light in proportion to the amount of energy stored thereon, and iii) photoelectrically detecting the emitted light and fluorescence, which is produced by the fluorescent substance located on the radiation image storage panel when the radiation image storage panel is exposed to the stimulating rays wherein an image signal representing the radiation image and a code signal corresponding to the identification code portion are obtained, said code signal being used to associate descriptive information with the radiation image.

8. A method for using a radiation image storage panel as defined in claim 7 wherein the radiation image storage panel, on which the radiation image has been stored, is scanned in two-dimensional directions with the stimulating rays.

9. A method for using a radiation image storage panel as defined in claim 7 wherein the stimulating rays comprise laser beam.

* * * * *